G. WONSOWICZ.
LOCKING DEVICE FOR AUTOMOBILES.
APPLICATION FILED NOV. 22, 1919.

1,368,676.

Patented Feb. 15, 1921.
2 SHEETS—SHEET 1.

George Wonsowicz
INVENTOR
BY
ATTORNEYS

G. WONSOWICZ.
LOCKING DEVICE FOR AUTOMOBILES.
APPLICATION FILED NOV. 22, 1919.
1,368,676.
Patented Feb. 15, 1921.
2 SHEETS—SHEET 2.
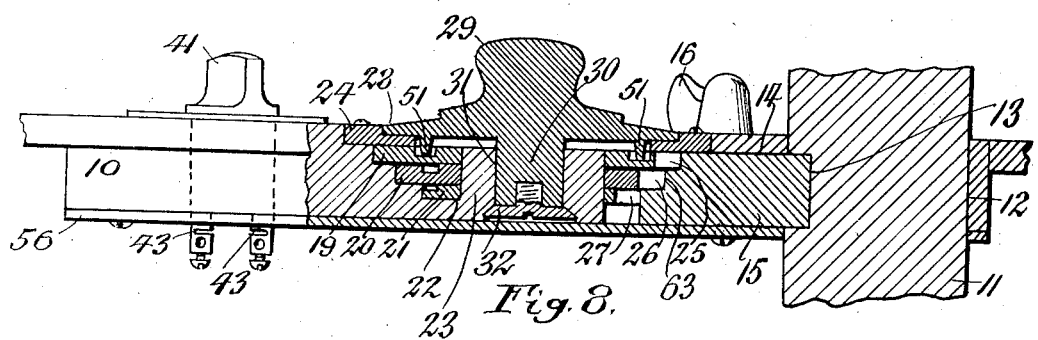
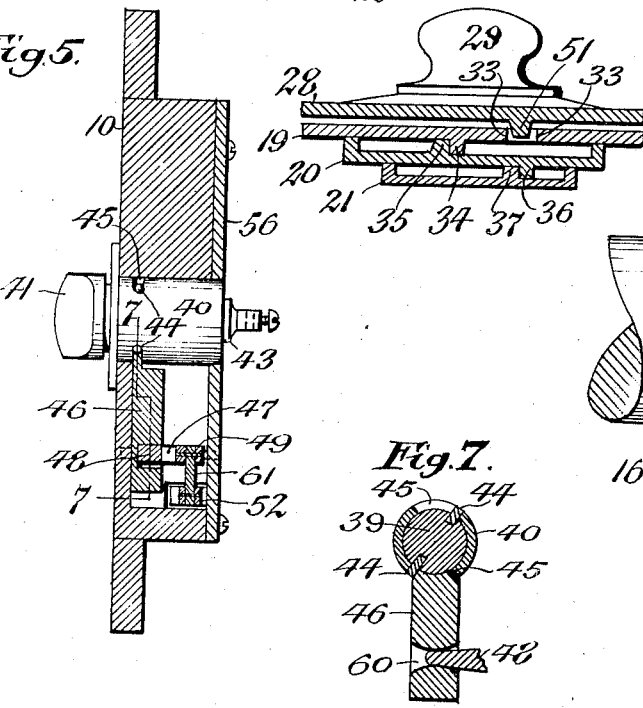
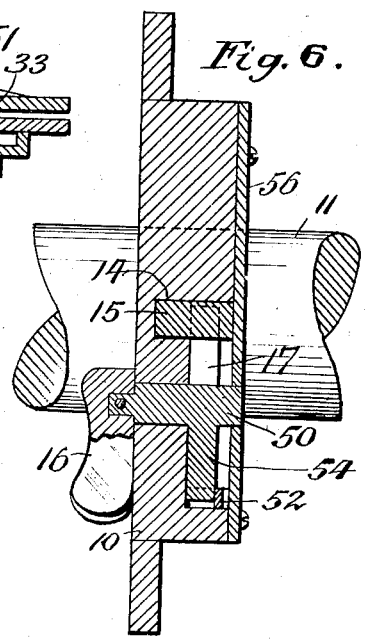
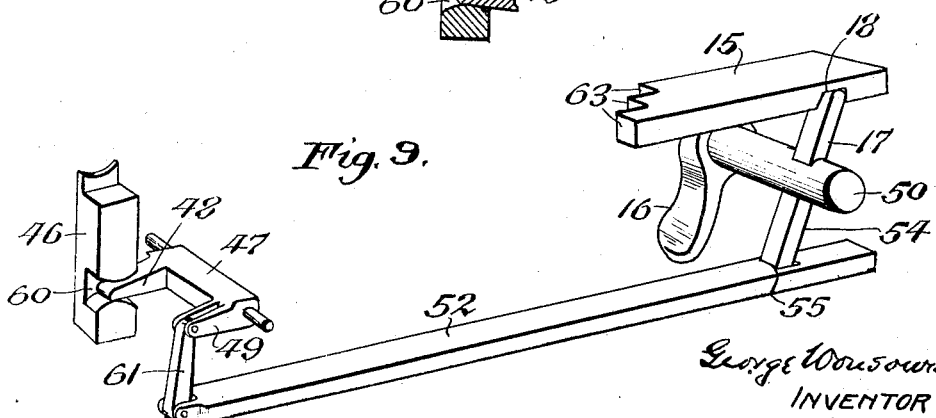
George Wonsowicz
INVENTOR
ATTORNEYS

UNITED STATES PATENT OFFICE.

GEORGE WONSOWICZ, OF FORKS, NEW YORK, ASSIGNOR OF ONE-HALF TO HENRY J. RALICKI, OF FORKS, NEW YORK.

LOCKING DEVICE FOR AUTOMOBILES.

1,368,676.             Specification of Letters Patent.      Patented Feb. 15, 1921.

Application filed November 22, 1919. Serial No. 339,790.

*To all whom it may concern:*

Be it known that I, GEORGE WONSOWICZ, a citizen of Poland, residing in Forks, in the county of Erie and State of New York, have invented new and useful Improvements in Locking Devices for Automobiles, of which the following is a specification.

This invention relates to a lock for automobiles which in its most approved form is so organized that the same may be operated to prevent unauthorized use of the automobile by locking both the steering post and the electric switch of the ignition system of the motor.

It is the object to provide a lock having this capacity which is comparatively simple in construction, capable of being easily operated for locking and releasing the steering post and switch and which can be readily applied to automobiles of standard construction.

Figure 1:
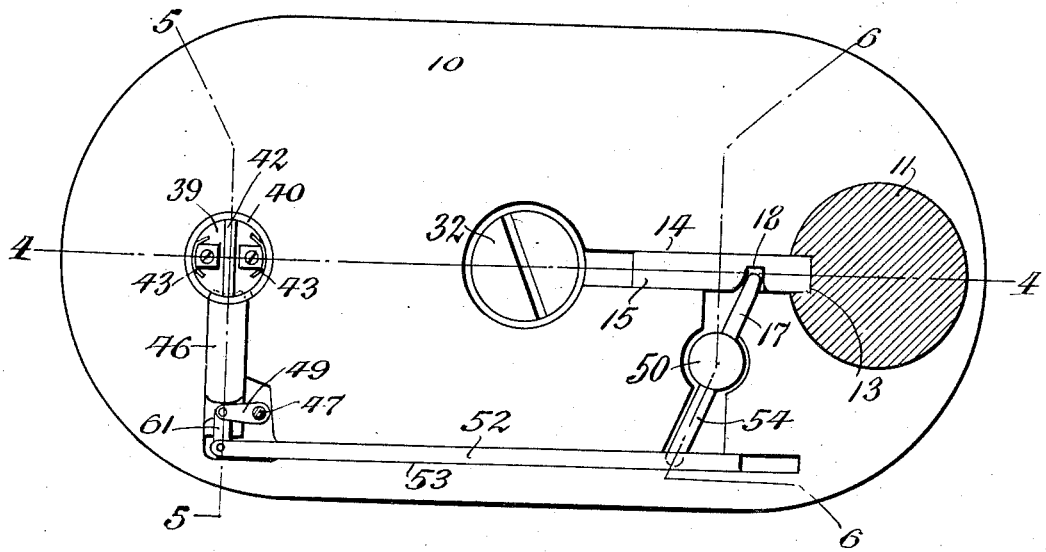
Figure 2:
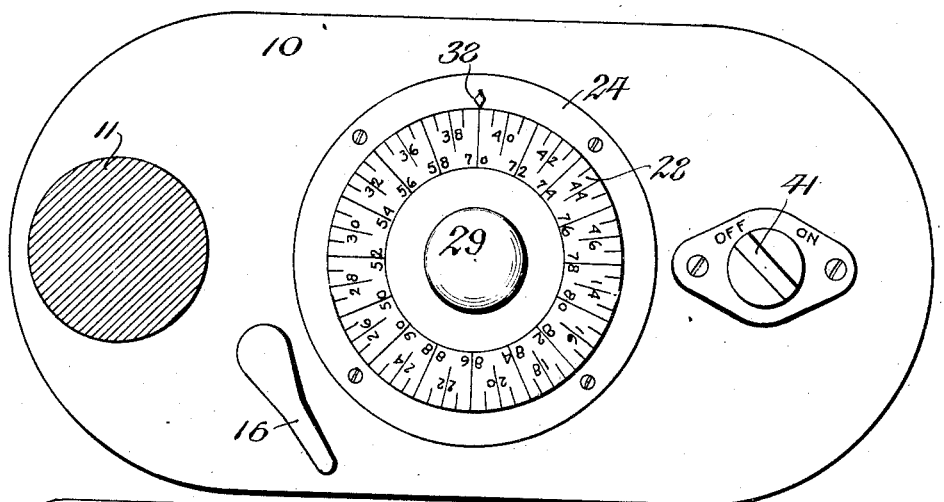
Figure 2:
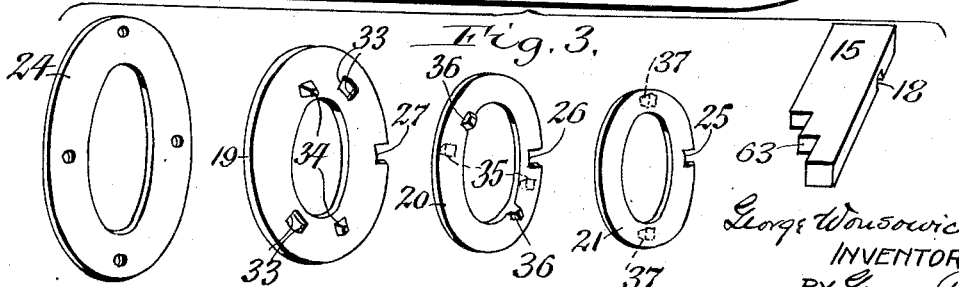

In the accompanying drawings:

Figure 1 is a rear elevation of my improved automobile lock showing the rear cover removed and the steering post in section. Fig. 2 is a front elevation of the same. Fig. 3 is a perspective of the several permutation tumblers, the retaining ring for holding the same in place and the locking bolt coöperating therewith, showing these members detached from each other. Fig. 4 is a longitudinal section taken on line 4—4, Fig. 1. Figs. 5 and 6 are vertical transverse sections taken on the correspondingly numbered lines in Fig. 1. Fig. 7 is a fragmentary vertical section taken on line 7—7, Fig. 5. Fig. 8 is a fragmentary horizontal section showing the manner in which the permutation tumblers are coupled with each other. Fig. 9 is a fragmentary perspective view showing the means for simultaneously operating the steering post locking bolt and the electric switch locking bolt.

Similar characters of reference refer to like parts throughout the several views.

10 represents a casing or body which may be mounted in any suitable manner on the dash or instrument board of an automobile. Extending through this casing are parts of the steering mechanism which controls the direction of the automobile and the electric switch which controls the ignition system of the motor either of which, but preferably both, are adapted to be locked by the mechanism forming the subject of this invention.

That part of the steering mechanism shown in the drawings preferably consists of the steering post or shaft 11, which extends through an opening 12 in the support and which is operatively connected at its lower end with the steering wheel and provided at its upper end with the usual hand wheel for turning the post. In its periphery this post is provided with a locking recess 13 which is arranged in line with a guide-way 14 in the casing. Sliding in this guide-way is a steering gear locking bolt 15 which may be moved forwardly so that its front end engages with said recess and thus locks the steering post against turning and moved backwardly so that its front end is disengaged from said recess and thus permits the steering post to turn—thereby enabling the steering post to be rendered operative and inoperative.

When it is free the steering gear locking bolt may be reciprocated by means of a rock shaft 50 journaled in suitable bearings in the casing and provided at its front end with a handle 16 for rocking the same and within the casing the rock shaft is provided with an upwardly projecting rock arm 17 which engages with a notch 18 in the underside of the bolt 15.

A permutation mechanism is provided having a plurality of tumblers which when arranged in concert permit said gear locking bolt to be withdrawn from the steering post but which may be shifted so that they are out of concert and prevent the withdrawal of said gear locking bolt from the post.

This permutation mechanism in the form shown in the drawings comprises a plurality of disk shaped tumblers 19, 20, 21 which are arranged in an annular cavity 22 in the casing and journaled on a central stud 23 formed on the body of the casing. These tumblers are preferably of successively smaller diameter from the front side of the casing toward the rear side thereof and the same are confined in the cavity 22 by a retaining ring 24 secured to the front side of the casing and overlapping the foremost tumbler disk, as shown in Fig. 4.

In the peripheries of the several tumbler disks the same are provided with notches 25, 26, 27, which upon turning the disks may be arranged in line opposite the steering gear locking bolt and thus permit the rear end of the latter to enter these notches and retract its front end from the recess of the steering post. When however the tumbler disks are turned so that their notches are not in line then the steering gear locking bolt can not be retracted from the recess of the steering post. The shifting of these tumbler disks into and out of register with each other is effected by means which comprise a rotary dial disk 28 overlapping the retaining ring 24 and provided on its front side with an annular row of graduations and centrally with a forwardly projecting knob or handle 29, an arbor 30 projecting rearwardly from the dial disk and journaled in a bearing 31 in the casing, a screw 32 secured to the rear end of the arbor and engaging with the rear side of the casing, a pair of coupling lugs 51 arranged on the rear side of the dial disk and adapted to engage with shoulders 33 on the front tumbler disk, a pair of coupling lugs 34 arranged on the rear side of the front tumbler disk and adapted to engage with a pair of shoulders 35 on the intermediate tumbler disk, and a pair of coupling lugs 36 arranged on the rear side of the intermediate tumbler disk and adapted to engage with a pair of shoulders 37 on the rear tumbler disk.

By turning the dial disk alternately in opposite directions so that different points of its annular graduations are successively and properly in line with a mark 38 on the retaining ring then the several tumbler disks will be so shifted relatively to each other to aline these notches 25, 26, 27 and permit the steering post locking bolt to be moved to unlock the steering post.

In order to adapt the steering gear locking bolt to the tumbler disk of varying diameter the rear end of this bolt is made step shaped, as shown at 62 in Figs. 3, 4 and 9.

The electric switch which controls the ignition system may be variously constructed but that shown in the drawings for example, comprises a rotary plug 39 of insulating material journaled in a metal socket 40 which is mounted on the casing and provided at its front end with a button 41 for turning the plug while its rear end is provided with a metal cross piece 42 which upon turning the plug may be engaged with and disengaged from two contacts 43, 43 forming part of the electric circuit of the ignition system of the motor and thus permit of controlling the operation of the latter. The rocking movement of this plug is limited by two stop pins 44, 44, arranged on opposite sides of the plug and engaging with segmental slots 45, 45, in the socket. The lower one of the slots 45 is adapted to be engaged and disengaged by the upper end of a vertically movable switch locking bolt 46 which latter in its upper position engages its upper end with the lower slot 45 so that it stands in the path of the lower stop pin 44 and obstructs the movement of the same so that the plug cannot be turned into a position in which its cross piece engages the switch contacts, while upon moving the switch locking bolt downwardly and disengaging its upper end from the lower slot 45 then the plug is free to be turned for closing the switch and permitting the ignition mechanism to operate the engine.

This switch locking bolt is preferably actuated by the same means which operate the steering mechanism locking bolt so that these devices may be simultaneously locked or released by the same permutation controlling mechanism. In their preferred construction these means comprise a rock shaft 47 which is journaled transversely in the casing and provided with front and rear rock arms 48, 49, the front arm 48 engaging with a notch 60 in the lower part of the switch locking bolt, an upright link 61 pivotally connected at its upper end with the rear rock arm 49, a longitudinal shifting bar 52 guided in a horizontal guide-way 53 in the rear part of the casing and pivotally connected at one end with the lower end of the link 61, and a rock arm 54 depending from the rock shaft 50 and engaging with a notch 55 in the shifting bar. It follows from this construction that when the shaft 50 is turned by hand the mechanism will be operated to simultaneously lock and unlock the steering post and switch.

The rear side of the casing is preferably covered by a plate 56 which extends over the internal mechanism of the permutation lock and associated parts to protect the same against tampering and the remaining parts of this device are also so organized that access to the same is difficult and practically prevents the permutation controlling device from being operated except by a person familiar with the combination at which the same has been set, thereby safeguarding automobiles equipped with the same against theft.

I claim as my invention:

1. A lock for automobiles comprising an electric switch having a movable member provided with a shoulder, a locking bolt movable into and out of the path of said shoulder, a rock shaft provided with two rock arms one of which engages said bolt, a link connected with the other arm of said rock shaft, a reciprocating shifting bar connected with said link, and locking means controlling the movement of said bar.

2. A lock for automobiles comprising an electric switch having a movable member provided with a shoulder, a locking bolt movable into and out of the path of said shoulder, a rock shaft provided with two rock arms one of which engages said bolt, a link connected with the other arm of said rock shaft, a reciprocating shifting bar connected with said link, a hand rock shaft having a rock arm engaging said bar, and permutation tumblers controlling the operation of said hand rock shaft.

3. A lock for automobiles comprising an electric switch having a movable member provided with a shoulder, a locking bolt movable into and out of the path of said shoulder, a rock shaft provided with two rock arms one of which engages said bolt, a link connected with the other arm of said rock shaft, a reciprocating shifting bar connected with said link, a hand rock shaft having two rock arms one of which engages with said bar, a reciprocating locking bolt which is engaged by the other arm of said hand rock shaft, a rotary steering post having a recess in its periphery which is engaged by one end of said last mentioned locking bolt in one position of the latter, and a plurality of permutation tumblers provided with notches which are adapted to be engaged by the opposite end of said last mentioned bolt when the latter is moved in the opposite direction.

GEORGE WONSOWICZ.